and Patent Number: 5,000,463
United States Patent [19]
Sun

[11] Patent Number: 5,000,463
[45] Date of Patent: Mar. 19, 1991

[54] SHAFT SEAL FOR SYSTEMS WITH INTERMITTENT OPERATION

[75] Inventor: Tsu-Hung Sun, Torrance, Calif.

[73] Assignee: Hughes Aircraft Company, Los Angeles, Calif.

[21] Appl. No.: 419,422

[22] Filed: Oct. 10, 1989

[51] Int. Cl.$^5$ .............................................. F16J 15/00
[52] U.S. Cl. ...................................... 277/33; 277/102; 277/113
[58] Field of Search ........................ 277/1, 5, 102, 106, 277/113, 58, 28, 7, 31, 33, 40, 901, 89–93; 92/165 R, 168; 251/129.01, 129.11, 56

[56] References Cited

U.S. PATENT DOCUMENTS

| | | | |
|---|---|---|---|
| 1,741,983 | 12/1929 | Ellberg et al. | 277/33 |
| 2,552,391 | 5/1951 | Baldwin | 277/102 |
| 2,625,883 | 1/1953 | Howser | 277/33 |
| 2,795,441 | 6/1957 | Gilbert et al. | 277/95 |
| 2,985,473 | 5/1961 | Parker | 277/97 |
| 3,472,169 | 10/1969 | Dyke et al. | 277/25 |
| 3,556,472 | 1/1971 | Grove | 251/214 |
| 4,127,275 | 11/1978 | Champlin | 277/81 R |
| 4,234,157 | 11/1980 | Hodgeman et al. | 251/56 |
| 4,421,321 | 12/1983 | Lipschitz | 277/96.1 |
| 4,436,280 | 3/1984 | Geisow | 251/56 |
| 4,624,282 | 11/1986 | Fargo | 251/129.1 |
| 4,643,437 | 2/1987 | Salant et al. | 277/28 |

FOREIGN PATENT DOCUMENTS

| | | | |
|---|---|---|---|
| 0616520 | 3/1961 | Canada | 277/33 |
| 0453640 | 12/1949 | Italy | 277/33 |

*Primary Examiner*—Allan N. Shoap
*Assistant Examiner*—D. G. DePumpo
*Attorney, Agent, or Firm*—Terje Gudmestad; W. K. Denson-Low

[57] ABSTRACT

A sealing system 40 for use in a cooling system 10 having a compressor with a shaft 20, at least partially disposed within a housing 12. The shaft 20 is adapted for rotational movement about the longitudinal axis 23 thereof. A working fluid is disposed within the housing 12 around the shaft 20. The sealing system 40 of the invention includes a coil 26 for moving the shaft 22 along the longitudinal axis thereof 23 from a first position to a second position. A sealing plate 42 is disposed about the shaft 22. Static seals 44, 46 are disposed about the shaft 22 between the sealing plate 42 and the housing 12. In the first position, the sealing plate 42 engages the static seals 44, 46 and the working fluid is retained within the housing 12. When the compressor is activated, the shaft 22 is translated by the coil 26 from the first position to a second position at which the sealing plate 42 is disengaged from the static seals 44, 46. Conventional dynamic seals 28 retain the working fluid when the cooling system 10 is in operation. Thus, the invention provides a sealing arrangement which extends the operating life of the cooling system by effectively retaining the working fluid thereof.

1 Claim, 2 Drawing Sheets

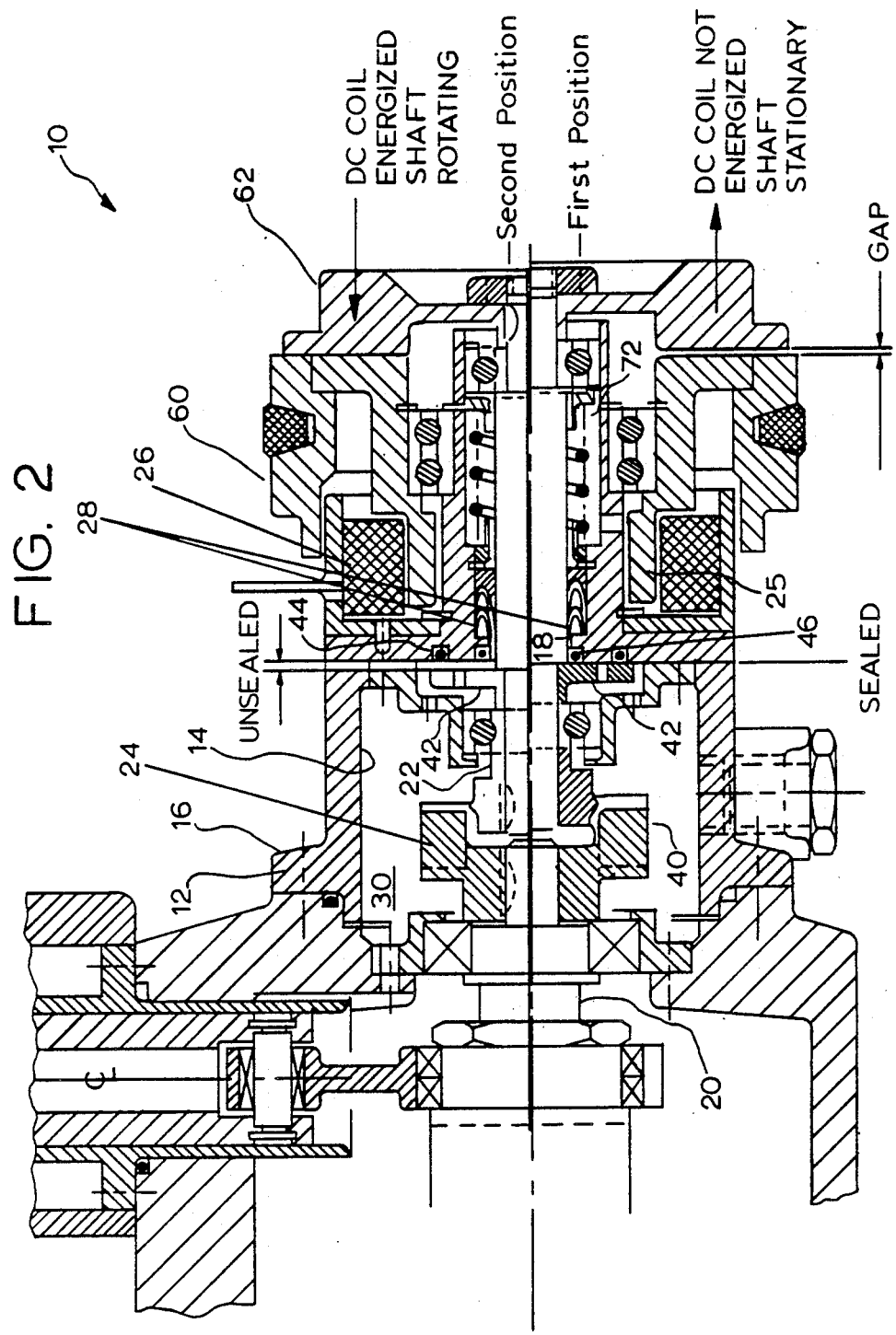

SHAFT SEAL FOR SYSTEMS WITH INTERMITTENT OPERATION

BACKGROUND OF THE INVENTION

1. Field of the Invention

The present invention relates to refrigeration systems. More specifically, the present invention relates to methods and apparatus for sealing refrigeration systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Freon is the refrigerant most frequently used in conventional refrigeration systems. Unfortunately, freon has been found to be detrimental to the atmosphere. That is, the chlorine in freon is currently believed to deplete the layer of ozone in the atmosphere. Thus, there is an ongoing effort to discover alternative approaches to the use of freon for air conditioning and refrigeration systems.

Reverse Stirling cycle refrigeration systems provide a promising alternative to conventional freon based systems. Currently for cooling infrared sensors, reverse Stirling cycle cryogenic refrigerators are used. A typical unit consists of a compressor piston in a first cylinder, an expansion piston in a second cylinder, and a drive mechanism including a motor, a crankshaft, flywheel, and connecting rod connecting the crankshaft to each piston, a regenerator, and a crankcase housing. The drive mechanism converts the rotary motion of a motor via a crankshaft to a reciprocating motion of the two pistons with a 90 degree phase angle there between. The unit is filled with helium gas which serves as the working fluid. The out-of-phase motion of the two pistons allows the gas to be compressed, expanded, and moved back and forth between the cylinders without the need for valves.

In theory, helium in the compressor is compressed isothermally while rejecting heat to the surroundings. During this phase of the cycle, most of the gas is in the compressor and regenerator volumes. The gas is then forced through the regenerator by the motion of the displacer piston causing it to be cooled at constant volume. The heat removed from the gas is stored in the regenerator. Cold gas from the regenerator is next expanded isothermally while absorbing heat from the low temperature source. The gas is then forced back through the regenerator where it is heated at constant volume. The energy stored in the regenerator is now transferred back to the gas.

Unfortunately, helium, as a working fluid, is difficult to seal. For certain applications, this is particularly problematic. For example, automotive air conditioning systems are typically designed for a 10 year life (100,000 miles). However, these systems are typically not used for 98% of the useful life thereof. This results to 3,000 hours of life as opposed to the designed life of 10 years. Hence, fluid leakage is a significant problem for both conventional/freon as well as the Stirling/helium air conditioning systems.

The leakage is due, at least in part, to the failure of dynamic seals about the rotating shaft of the compressor. A typical dynamic seal for a rotating shaft is either a "lip seal" or a "face seal". As these types of seals have to seal against a rotating surface in order to allow the relative motion, the seal can not be tightly held against the shaft. Consequently, a small leak will occur and will get worse after the seal is worn. In the automotive air conditioner, the leakage occurs from such damaged and worn dynamic seals.

Thus, there is a need in the art for an improvement in the sealing systems of conventional and Stirling cycle cryogenic refrigeration and air conditioning systems.

SUMMARY OF THE INVENTION

The need in the art is addressed by the sealing system of the present invention. The invention is a sealing system for use in a cooling system having a compressor with a shaft, at least partially disposed within a housing. The shaft is adapted for rotational movement about the longitudinal axis thereof. A working fluid is disposed within the housing around the shaft. The sealing system of the invention includes an actuator (e.g. a coil) for moving the shaft along the longitudinal axis thereof from a first position to a second position. A sealing plate is disposed about the shaft. Static seals are disposed about the shaft between the sealing plate and the housing.

In the first position, the sealing plate engages the static seals and the working fluid is retained within the housing. When the compressor is activated, the shaft is translated by the coil from the first position to a second position at which the sealing plate is disengaged from the static seals. Conventional dynamic seals retain the working fluid when the cooling system is in operation. Thus, the invention provides a sealing arrangement which extends the operating life of the cooling system by effectively retaining the working fluid thereof.

BRIEF DESCRIPTION OF THE DRAWINGS

FIG. 2 is a more detailed representation of a portion of the cooling system 10 incorporating the sealing system 20 of the present invention.

DESCRIPTION OF THE INVENTION

Figure 1:
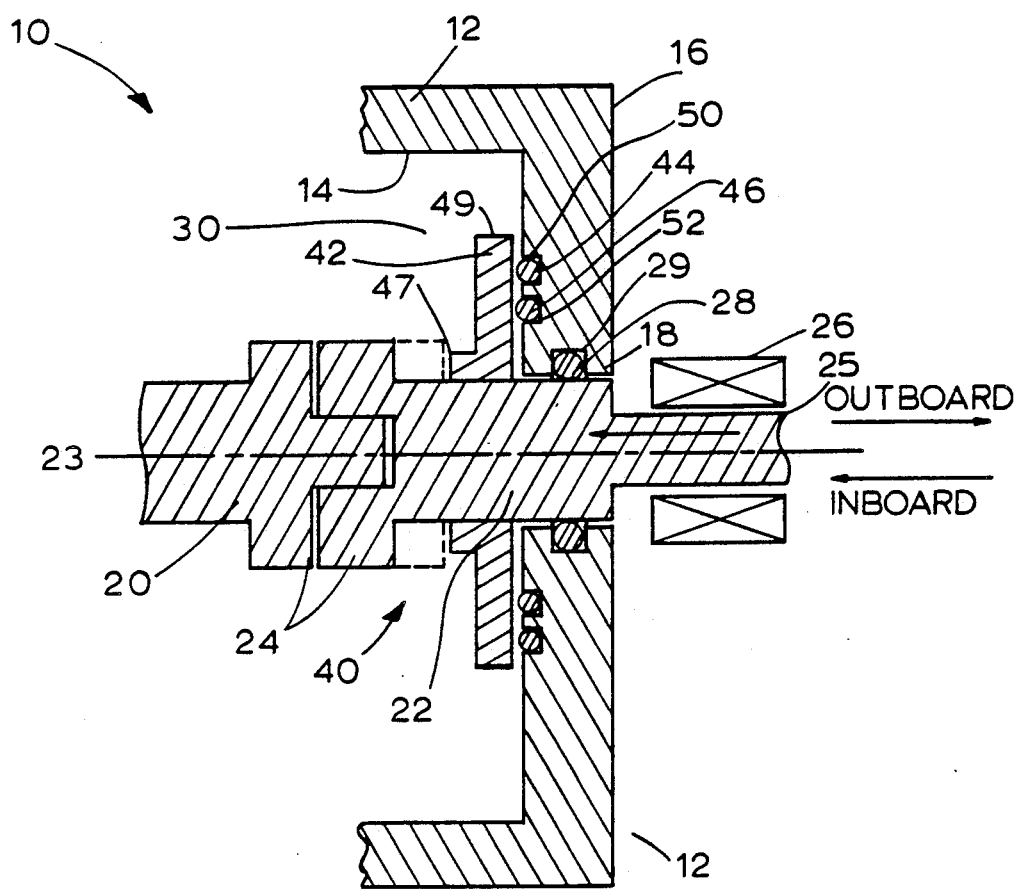
FIG. 1 is a simplified sectional view of an illustrative embodiment of the sealing system of the present invention in a typical cooling system.

FIG. 1 is a simplified sectional view of an illustrative embodiment of the sealing system of the present invention in a portion of a typical cooling system 10. The cooling system 10 includes a housing 12 made of aluminum or other suitable material. Only a portion of the housing 12 is shown in FIG. 1 for simplicity. The housing 12 has an inner wall 14, an outer wall 16 and a circular aperture wall 18 therebetween.

One end of a main shaft 20 is attached to a drive mechanism (not shown) of a compressor of the cooling system 10. The opposite end of the main shaft 20 is connected to a sliding shaft 22 via an off-the-shelf coupler 24. The shafts 20 and 22 have a common longitudinal axis 23. The coupler 24 typically has a tongue and groove design effective to provide for the transfer of rotational motion from the sliding shaft 22 to the main shaft 20. The sliding shaft 22 is an integral element of the sealing system of the present invention. In a conventional system, the sliding shaft 22 would be replaced by the main shaft 20.

The sliding shaft 22 is driven from a first (sealed) position (shown in phantom) to a second position by the electromotive force produced by the energization of a coil 26 mounted about the noncoupled end 25 thereof. The coil 26 may be replaced by a mechanical drive without departing from the scope of the present invention. The sliding shaft 22 extends through the aperture 18 in the housing 12 and is engaged by an annular dynamic seal 28. The dynamic seal is of conventional fabrication (e.g. ceramic) and is at least partially retained within an annular groove 29 in the aperture wall 18 of the housing 12.

In conventional systems, the dynamic seal 18 serves to retain a gas or working fluid (not shown) retained within a chamber 30 provided by the housing 12. Unfortunately, as mentioned above, the dynamic seal of such conventional systems experiences considerable wear due to the required close contact with a rotating main shaft. Damaged dynamic seals become ineffective and permit the leakage of the working fluid. This problem is addressed by the sealing system 40 of the present invention which includes the sliding shaft 22, the coupler 24, the coil 26, an annular static seal sealing plate 42, and first and second seals 44 and 46.

The static seal sealing plate 42 is annular with an aperture therethrough, through which the sliding shaft 22 extends. The static seal sealing plate has a collar 47 and an annular flange 49 extending therefrom. The shafts 20 and 22 and the static seal sealing plate 42 may be made of steel or other suitable material.

The first and second annular static seals 44 and 46 are retained within first and second concentric annular grooves 50 and 52 in the inner wall 14 of the housing 12. The static seals are made of neoprene or other material suitable for a particular application.

FIG. 2 is a more detailed representation of a portion of the cooling system 10 incorporating the sealing system 20 of the present invention. The cooling system 10 is shown with the static seals 44 and 46 mounted on the inner wall 14 of the housing 12. (Note that the dynamic seals 28 are implemented with spring loaded reciprocating type seals in 'O' ring grooves such as that manufactured by the Bal Company in Santa Ana, Calif.) A driver pulley drives a driven assembly including the main shaft 20, the sliding shaft 22, the shaft coupling 24, and the sealing plate 42 from the first position (sealed), shown as the lower half thereof, to the second position, shown as the upper half thereof for the purpose of illustration. Hence, in the first position, the coil 26 is not energized and the sliding shaft 22 is stationary. In the second position, the coil 26 is energized and the shaft 22 is free to rotate.

In operation, when the cooling system 10 is not in operation, the coil is de-energized and the driven assembly 62 is in the first position. When the cooling system 10 is activated, the coil 26 is energized and the driven assembly 62 moves from the first position to the second position. At the second position, the sealing plate disengages the static seals 44 and 46 and the sliding shaft 22 is free to rotate. When the system 10 is deactivated, the coil is again de-energized. The driven assembly is returned to the first position by the pressure of the gas or working fluid in the chamber 30. In addition, a spring 70 may be included between the shaft 22 and the housing 12 to assure a tight seal of the plate 42 against the seals 44 and 46.

Those skilled in the art will appreciate that the coil 26, or optional mechanical driver, should be designed to provide a sufficient actuating force along the longitudinal axis 23 of the shaft 22.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly, What is claimed is:

1. A sealing system comprising:
   a housing having an inner wall, at least partially defining a first volume, an outer wall, at least partially defining a second volume, and an aperture therebetween;
   an annular seal having a diameter greater than that of said aperture and disposed coaxially thereabout; and
   compression means for compressing said annular seal against said inner wall of said housing and thereby preventing fluid flow from said first volume to said second volume, said compression means including
   a shaft extending through said aperture in said housing and movable with respect to said housing from a first dynamic position to a second static position,
   a sealing plate disposed coaxially with respect to said shaft about the periphery thereof,
   a dynamic seal mounted coaxially about the periphery of said shaft between said shaft and said housing, said dynamic seal comprising an o-ring in a groove in said housing between said inner and outer walls so that a portion of said o-ring surrounds said aperture, said o-ring being in sealing engagement at all times with said housing and with said shaft; and
   motive means for axially moving said shaft from said first position to said second position at which said sealing plate compresses said annular seal against said inner wall of said housing.

* * * * *